United States Patent
Ishikawa

(10) Patent No.: US 12,047,504 B2
(45) Date of Patent: Jul. 23, 2024

(54) SEMICONDUCTOR DEVICE INCLUDING A NORMAL MODE, A DEBUG MODE, AND A KEY

(71) Applicants: Kabushiki Kaisha Toshiba, Tokyo (JP); Toshiba Electronic Devices & Storage Corporation, Tokyo (JP)

(72) Inventor: Yuji Ishikawa, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 225 days.

(21) Appl. No.: 17/472,256

(22) Filed: Sep. 10, 2021

(65) Prior Publication Data

US 2022/0114077 A1    Apr. 14, 2022

(30) Foreign Application Priority Data

Sep. 18, 2020  (JP) ................................. 2020-157148

(51) Int. Cl.
  *H04L 9/32*  (2006.01)
  *H04L 9/34*  (2006.01)
  *G06F 11/36* (2006.01)

(52) U.S. Cl.
  CPC ............ *H04L 9/32* (2013.01); *G06F 11/3648* (2013.01); *G06F 2221/2141* (2013.01)

(58) Field of Classification Search
  CPC .. G06F 11/3648; G06F 11/3664; G06F 21/14; G06F 21/629; H04L 9/32
  USPC ............................................................. 726/30
  See application file for complete search history.

(56) References Cited

U.S. PATENT DOCUMENTS

| | | | | |
|---|---|---|---|---|
| 5,546,562 A | * | 8/1996 | Patel ...................... | G06F 30/33 714/33 |
| 5,592,077 A | * | 1/1997 | Runas .................... | G11C 29/50 714/732 |
| 6,173,425 B1 | * | 1/2001 | Knaack ................ | G11C 29/003 714/738 |
| 6,385,748 B1 | * | 5/2002 | Chen .............. | G01R 31/318516 714/724 |
| 6,671,844 B1 | * | 12/2003 | Krech, Jr. ............. | G11C 29/56 714/736 |
| 7,020,741 B1 | * | 3/2006 | Tischler .............. | G06F 13/1636 365/222 |

(Continued)

FOREIGN PATENT DOCUMENTS

CN       103716028 A   *   4/2014
CN       105025292 A       11/2015
(Continued)

*Primary Examiner* — Haresh N Patel
(74) *Attorney, Agent, or Firm* — Maier & Maier, PLLC

(57) ABSTRACT

According to one embodiment, a semiconductor device includes a first system including a first operation circuit, and a second system configured to control a debug operation in the first system. The semiconductor device includes a normal mode and a debug mode. In the debug mode of the semiconductor device, in a case where a first key received from an outside corresponds to a second key stored in the second system, the second system transmits a debug command to the first operation circuit.

8 Claims, 11 Drawing Sheets

(56) References Cited

U.S. PATENT DOCUMENTS

| | | | |
|---|---|---|---|
| 7,356,742 B2* | 4/2008 | Aoki | G11C 29/56 |
| | | | 714/719 |
| 7,728,438 B2 | 6/2010 | Kameyama et al. | |
| 7,999,383 B2* | 8/2011 | Hollis | H01L 21/76804 |
| | | | 257/777 |
| 11,280,829 B1* | 3/2022 | Poolla | G01R 31/3177 |
| 2008/0205651 A1 | 8/2008 | Goto et al. | |
| 2009/0307783 A1 | 12/2009 | Maeda et al. | |
| 2012/0084757 A1 | 4/2012 | Tamiya | |
| 2014/0085353 A1 | 3/2014 | Yokonuma | |
| 2017/0115350 A1* | 4/2017 | Zhang | G01R 31/31705 |
| 2018/0351945 A1* | 12/2018 | Li | H04W 8/205 |
| 2022/0308982 A1* | 9/2022 | Ruan | G06F 11/302 |
| 2023/0125154 A1* | 4/2023 | Yu | G06F 8/65 |
| | | | 726/23 |

FOREIGN PATENT DOCUMENTS

| | | |
|---|---|---|
| JP | 2007-226276 A | 9/2007 |
| JP | 2011-022880 A | 2/2011 |
| JP | 4814319 B2 | 11/2011 |
| JP | 2012-79130 A | 4/2012 |
| JP | 4912921 B2 | 4/2012 |
| WO | 2012-172976 A1 | 12/2012 |

* cited by examiner

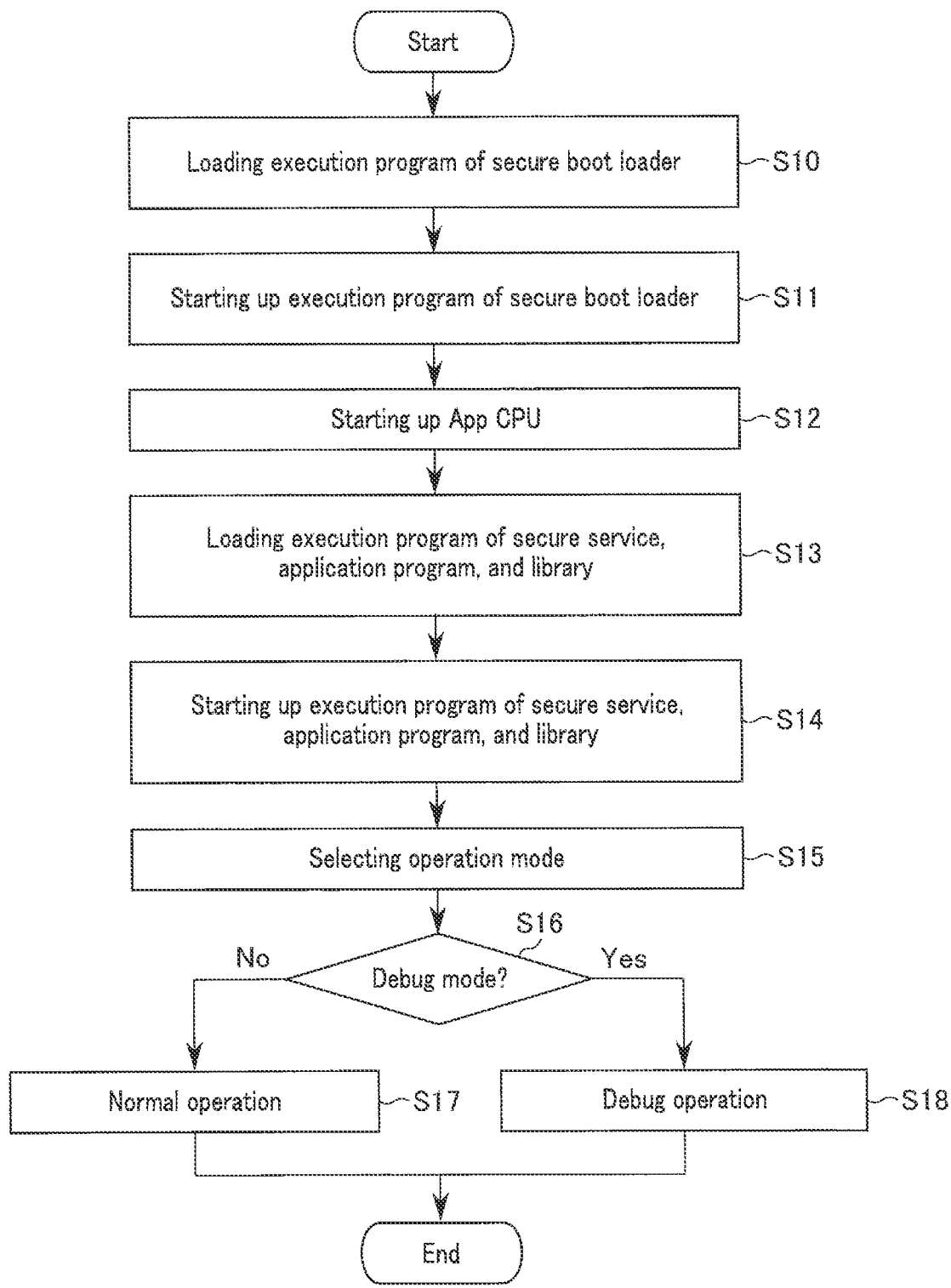
F I G. 3

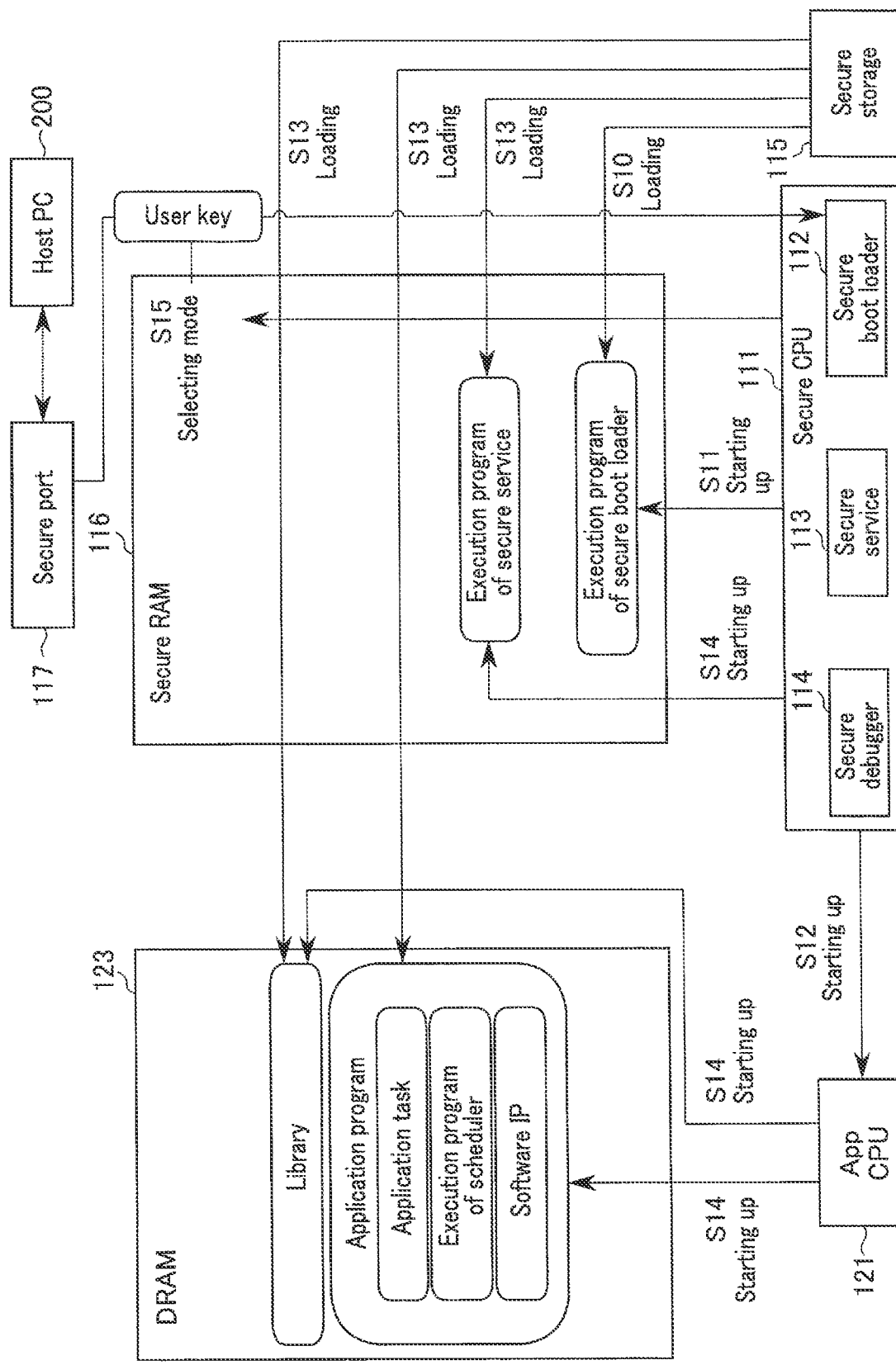
F I G. 4

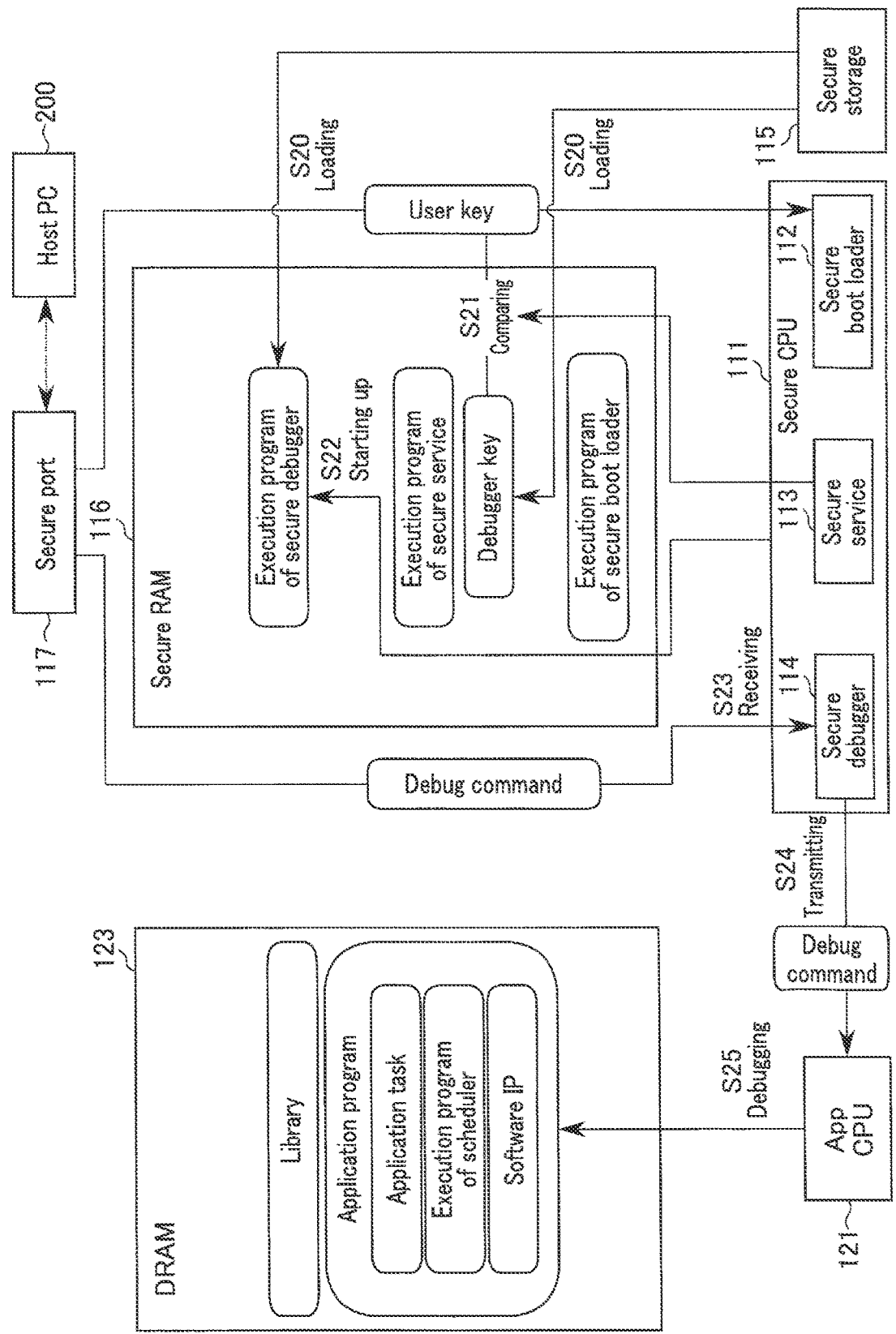
F I G. 6

| Application program | Address range | Permission key |
|---|---|---|
| task001 | 0x4000_000~0x4100_000 | 0x12345678 |
| task002 | 0x4200_000~0x4300_000 | 0xaa55bb44 |
| softIP001 | 0x5000_000~0x5300_000<br>0x6000_000~0x6100_000 | 0x18273645 |

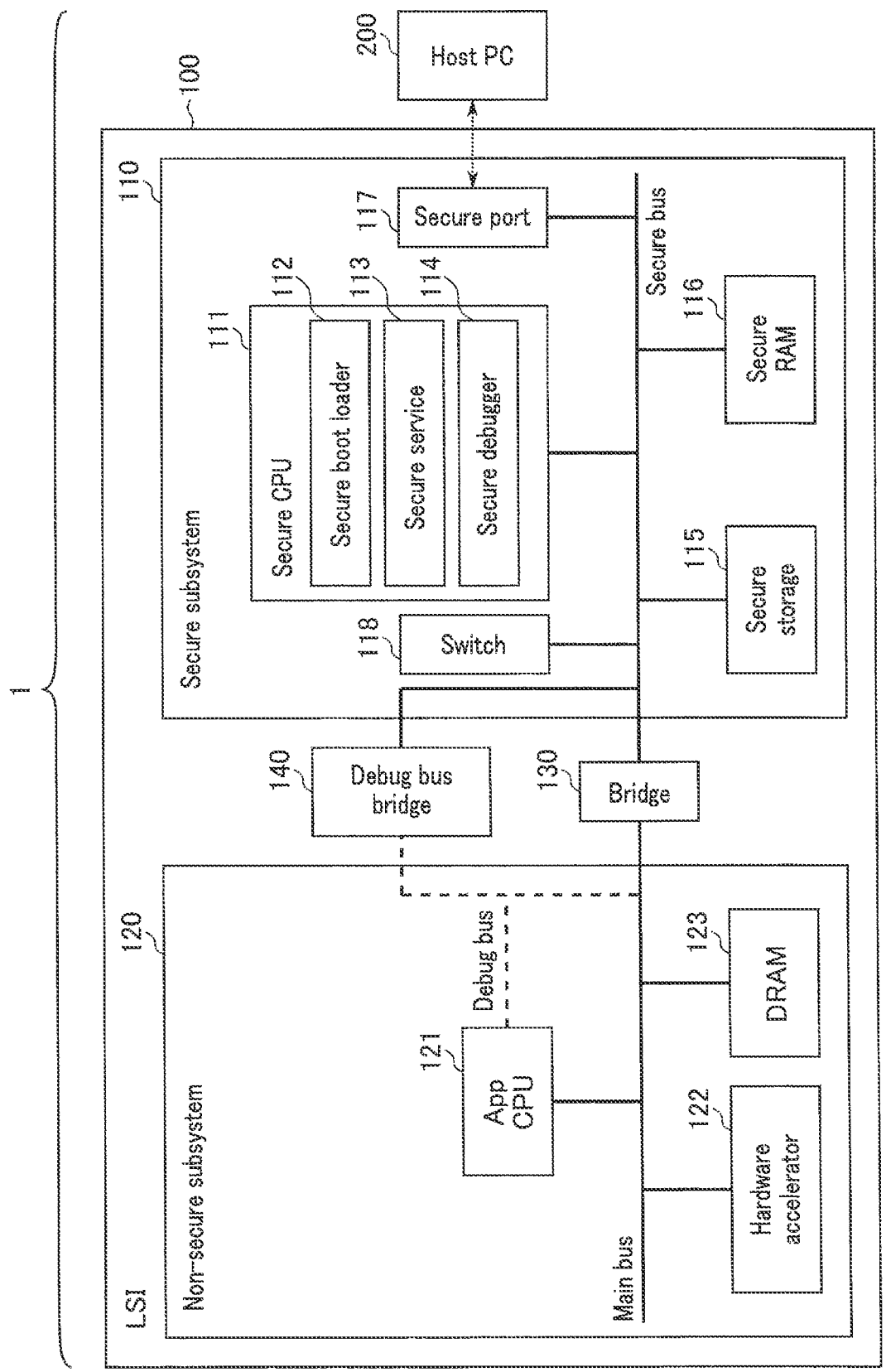
F I G. 12

SEMICONDUCTOR DEVICE INCLUDING A NORMAL MODE, A DEBUG MODE, AND A KEY

CROSS-REFERENCE TO RELATED APPLICATIONS

This application is based upon and claims the benefit of priority from Japanese Patent Application No. 2020-157148, filed Sep. 18, 2020, the entire contents of which are incorporated herein by reference.

FIELD

Embodiments described herein relate generally to a semiconductor device and a system including the semiconductor device.

BACKGROUND

In semiconductor devices, a program debugging technique has been known. At present, semiconductor devices are incorporated into various systems such as, e.g., a vehicle-mounted system and a consumer system. The vehicle-mounted system is required to be high in reliability and safety and thus demands program debugging. The consumer system also demands program debugging.

BRIEF DESCRIPTION OF THE DRAWINGS

FIG. 3 is a flowchart showing an operation of the semiconductor device according to the first embodiment.

FIG. 4 is a diagram illustrating the operation of the semiconductor device according to the first embodiment.

FIG. 6 is a diagram illustrating the debug operation of the semiconductor device according to the first embodiment.

FIG. 12 is a block diagram of a vehicle-mounted system including a semiconductor device according to a third embodiment.

DETAILED DESCRIPTION

Figure 1:
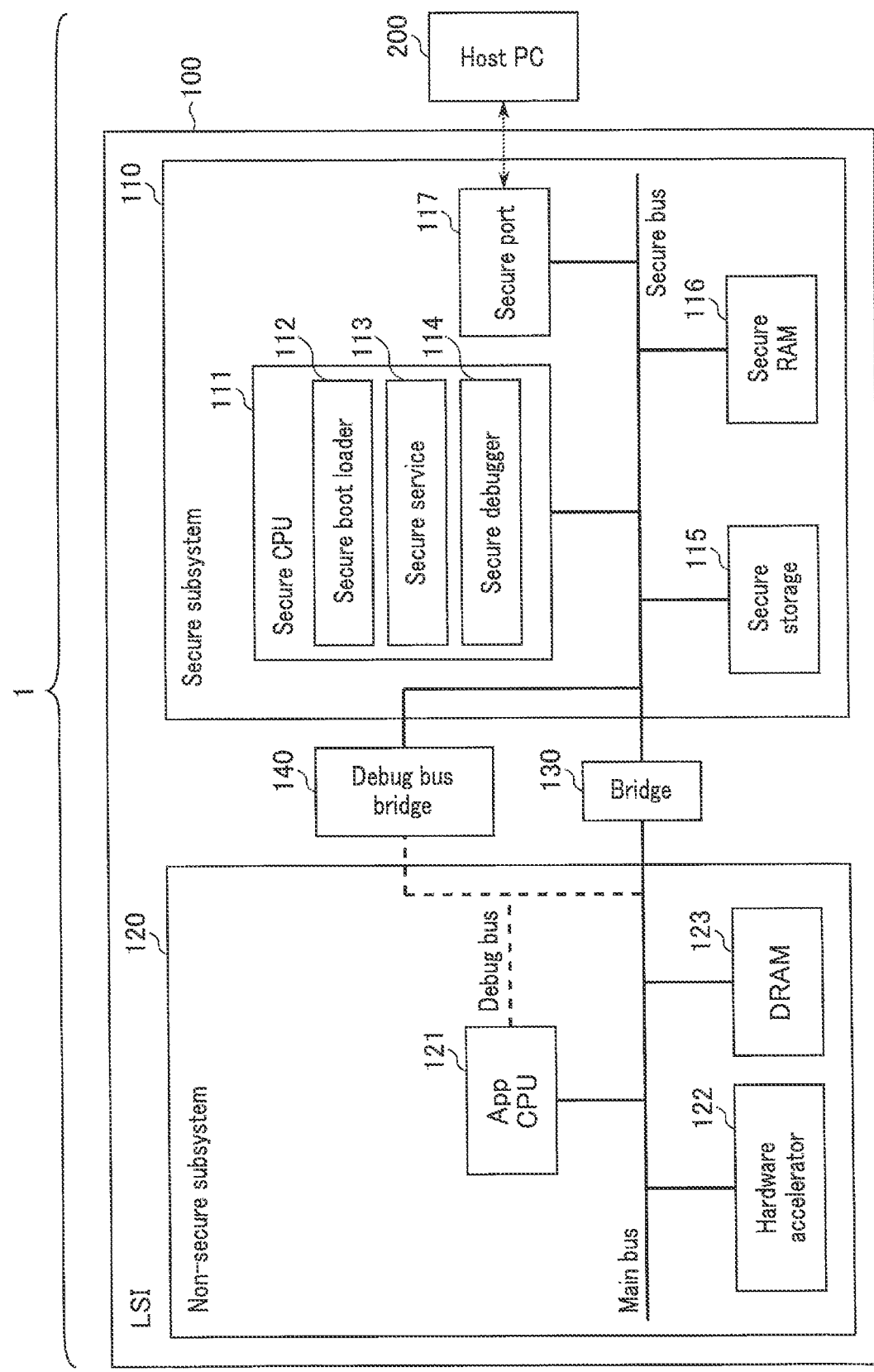
FIG. 1 is a block diagram of a vehicle-mounted system including a semiconductor device according to a first embodiment.

In general, according to one embodiment, a semiconductor device includes a first system including a first operation circuit, and a second system configured to control a debug operation in the first system. The semiconductor device includes a normal mode and a debug mode. In the debug mode of the semiconductor device, in a case where a first key received from an outside corresponds to a second key stored in the second system, the second system transmits a debug command to the first operation circuit.

Hereinafter, embodiments will be described with reference to the drawings. In the following description, constituent elements having the same function and configuration will be assigned common reference numerals.

1. First Embodiment

A semiconductor device according to a first embodiment will be described. In the following, a system LSI (hereinafter, simply referred to as "Large Scale Integrated circuit: LSI") included in a vehicle-mounted system that performs image recognition, etc., will be described as an example of the semiconductor device.

1.1 Configuration

1.1.1 Overall Configuration of Vehicle-Mounted System

First, an overall configuration of a vehicle-mounted system (hereinafter, simply referred to as "system") including the LSI according to the present embodiment will be described with reference to FIG. 1. FIG. 1 is a block diagram showing the overall configuration of the system including the LSI according to the present embodiment.

As shown in FIG. 1, a system 1 includes an LSI 100 and a host Personal Computer (PC) 200. The system 1 shown in FIG. 1 omits constituent elements such as a camera which transmits an input image to the LSI 100, an image input interface (I/F) within the LSI 100, which receives the input image from the camera, an image output I/F within the LSI 100, which transmits an output image, and a panel which displays the output image from the LSI 100. The LSI 100 performs particular data processing (such as image recognition, etc.), processing which requires confidentiality (such as encryption, etc.), debugging of a program within the LSI 100, and so on. The host PC 200 is coupled to the LSI 100 through a communication via a network (not shown) and transmits to the LSI 100 such as a command for ordering debugging of a program within the LSI 100 (hereinafter, referred to as a "debug command").

The LSI 100 includes a secure subsystem 110, a non-secure subsystem 120, a bridge 130, and a debug bus bridge 140. The LSI 100 according to the present embodiment includes a normal mode and a debug mode. Throughout this description, the normal mode is an operation mode in which a normal operation such as execution of an application program is performed, and the debug mode is an operation mode in which debugging of a program within the LSI 100 is executed by an external device such as the host PC 200.

The secure subsystem 110 includes a secure CPU 111, a secure storage 115, a secure RAM 116, and a secure port 117. The secure CPU 111, the secure storage 115, the secure RAM 116, and the secure port 117 are each coupled to a secure bus. In FIG. 1, the secure bus is indicated by a solid line.

The secure subsystem 110 performs, for example, processing for managing the entire LSI 100, encryption processing, and signature processing, etc. The secure subsystem 110 communicates with the host PC 200 via, for example, the secure port 117, controls debugging of a program within the LSI 100, and so on. At power-on, the secure subsystem 110 starts up before the non-secure subsystem 120.

The secure CPU 111 controls the operation of the entire LSI 100. The secure CPU 111 includes three function (circuit) blocks (a secure boot loader 112, a secure service 113, and a secure debugger 114). The secure boot loader 112, the secure service 113, and the secure debugger 114 are not limited to a case in which they are implemented by a program (firmware). The secure boot loader 112, the secure service 113, and the secure debugger 114 may be implemented by a dedicated circuit that is provided inside the secure subsystem 110 and is independent of the secure CPU 111.

At power-on, the secure CPU 111 loads an execution program prog_loader of the secure boot loader 112 from the secure storage 115 into the secure RAM 116, thereby starting up the execution program prog_loader. This causes the secure boot loader 112 to start operating. The secure CPU 111 starts up the application CPU 121 within the non-secure subsystem 120. Details of the application CPU 121 will be described later.

The secure boot loader 112 performs arithmetic processing based on the execution program prog_loader of the secure boot loader 112 stored in the secure storage 115.

More specifically, the secure boot loader 112 causes the secure CPU 111 to load an execution program prog_service of the secure service 113 from the secure storage 115 into the secure RAM 116, and to load the application program and a library from the secure storage 115 into the DRAM 123. The secure boot loader 112 causes the secure CPU 111 to start up the loaded execution program prog_service of the secure service 113. This causes the secure service 113 to start operating. The secure boot loader 112 causes the application CPU 121 to start up the application program and the library. In the debug mode, the secure boot loader 112 causes the secure CPU 111 to load an execution program prog_debugger of the secure debugger 114 and a debugger key from the secure storage 115 into the secure RAM 116. Details of the debugger key will be described later.

The secure service 113 performs arithmetic processing based on the execution program prog_service of the secure service 113 stored in the secure storage 115.

For example, the secure service 113 performs the encryption processing, the signature processing, and so on based on a request from the application CPU 121 that executes the application program.

In the debug mode, the secure service 113 causes the secure CPU 111 to start up the execution program prog_debugger of the secure debugger 114. This causes the secure debugger 114 to start operating. More specifically, when the secure boot loader 112 receives a user key from a debugger user interface (UI) (not shown) within the host PC 200, the secure service 113 compares the user key with the debugger key loaded into the secure RAM 116. In the case where the user key corresponds to the debugger key, the secure service 113 causes the secure CPU 111 to start up the execution program prog_debugger. In the case where the user key does not correspond to the debugger key, the secure service 113 does not cause the secure CPU 111 to start up the execution program prog_debugger. The debugger UI is an interface for a user to input and receive information when performing debugging. The user key is a key input by a user who is attempting to execute debugging of the application program by access from the host PC 200 via the secure port 117 in order to start up the execution program prog_debugger. Throughout this description, "one key corresponds to another key" means that one key and another key have some kind of correspondence relationship, such as a match (perfect match) between one key and another key, a match between a portion of one key and another key, a match between a portion of one key and a portion of another key, etc.

The secure debugger 114 performs arithmetic processing based on the execution program prog_debugger of the secure debugger 114 stored in the secure storage 115.

For example, when receiving the debug command from the host PC 200 via the secure port 117 in the debug mode, the secure debugger 114 transmits the received debug command to the application CPU 121 and controls the operation of the application CPU 121. The debug command designates, e.g., an address range which is a debug target.

The secure storage 115 is a nonvolatile memory and stores a secure program, the application program, and so on.

The secure RAM 116 is a volatile memory, and stores the secure program loaded from the secure storage 115, temporary data at the time of execution of the secure program, and so on.

The secure port 117 communicates with an external device such as the host PC 200 via a network. Examples of a protocol used for a communication include a controller area network (CAN), and so on.

The non-secure subsystem 120 includes the application CPU (hereinafter, referred to as "App CPU") 121, a hardware accelerator 122, and a DRAM 123. The App CPU 121, the hardware accelerator 122, and the DRAM 123 are each coupled to a main bus. In FIG. 1, the main bus is indicated by a solid line. The non-secure subsystem 120 receives, for example, an input image from a camera (not shown) via an image input I/F (not shown), and performs image recognition processing, person detection processing, and so on.

The App CPU 121 controls an operation of the non-secure subsystem 120. The App CPU 121 executes, for example, the application program loaded from the secure storage 115 into the DRAM 123. The App CPU 121 controls, for example, an operation of the hardware accelerator 122. The App CPU 121 includes a debug unit (not shown) as a function block for stopping debugging of the application program and for viewing internal data in the process of being debugged.

The hardware accelerator 122 performs, for example, image processing (deformation of a particular image, extraction of a feature point of a particular image, image recognition, and so on). Examples of the hardware accelerator 122 include a digital signal processor (DSP), and so on.

The DRAM 123 is a volatile memory, and stores the application program loaded from the secure storage 115, temporary data at the time of execution of the application program, and so on.

The bridge 130 couples the secure bus to the main bus. The bridge 130 permits the secure subsystem 110 to access the non-secure subsystem 120. Accordingly, the secure subsystem 110 is able to perform, via the bridge 130, execution of programs within the non-secure subsystem 120, loading of data into the non-secure subsystem 120, reading of data from the non-secure subsystem 120, writing of data into the non-secure subsystem 120, and so on. The bridge 130 does not permit the non-secure subsystem 120 to access the secure subsystem 110. Accordingly, the non-secure subsystem 120 is unable to perform execution of programs within the secure subsystem 110, loading of data into the secure subsystem 110, reading of data from the secure subsystem 110, writing of data into the secure subsystem 110, and so on.

The debug bus bridge 140 couples the secure bus to the debug bus. The debug bus is coupled to the App CPU 121 and the main bus. In FIG. 1, the debug bus is indicated by a broken line. The debug bus bridge 140 permits the secure subsystem 110 to access the debug bus of the non-secure subsystem 120 but does not permit the non-secure subsystem 120 to access the secure subsystem 110. In the debug mode, an operation of the App CPU 121 can be controlled by the secure subsystem 110 via the secure bus, the debug bus bridge 140, and the debug bus.

Different address ranges are respectively mapped on the bridge 130 and the debug bus bridge 140. For example, one address range is mapped on the bridge 130 and allows access via the bridge 130. Another address range is mapped on the debug bus bridge 140 and allows access via the debug bus bridge 140.

The host PC 200 communicates with the secure port 117 via the network. The host PC 200 transmits, for example, the debug command, etc., to the secure port 117.

1.1.2 Programs, Etc. in Secure Storage 115

Figure 2:
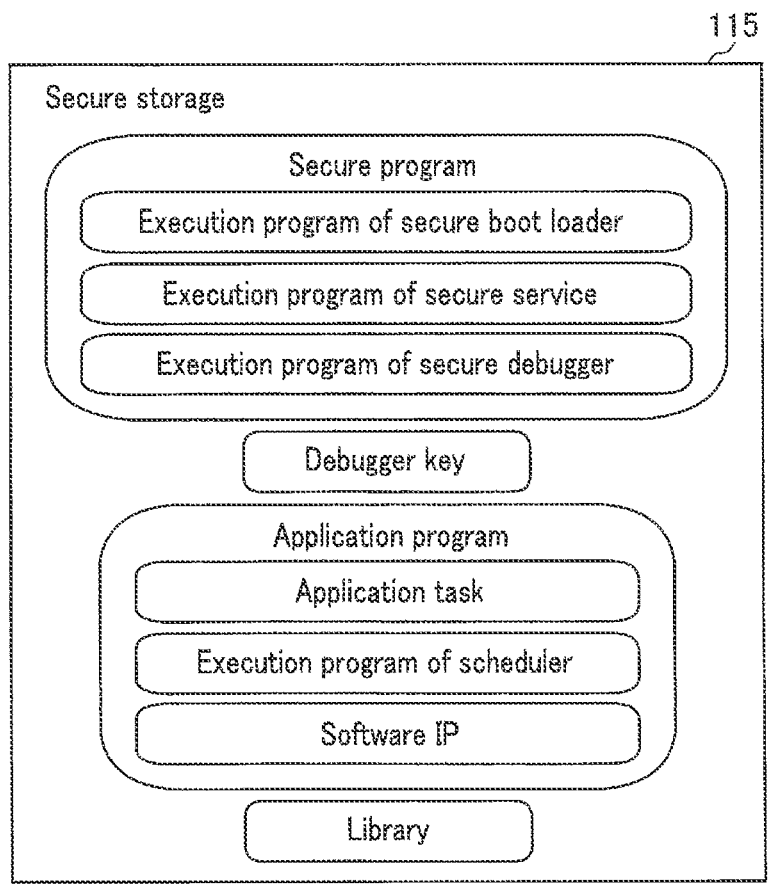
FIG. 2 is a diagram showing programs, etc. stored in a secure storage included in the semiconductor device according to the first embodiment.

Next, details of programs, etc. stored in the secure storage 115 included in the LSI 100 according to the present embodiment will be described with reference to FIG. 2. FIG. 2 is a diagram showing one example of programs, etc. stored in the secure storage 115 included in the LSI 100 according to the present embodiment.

The secure storage 115 stores the secure program, the debugger key, the application program, and the library.

The secure program includes the execution program prog_loader of the secure boot loader 112, the execution program prog_service of the secure service 113, and the execution program prog_debugger of the secure debugger 114. The secure CPU 111 loads the secure program stored in the secure storage 115 into the secure RAM 116. By the secure CPU 111 executing the secure program loaded into the secure RAM 116, the secure subsystem 110 functions as a system including the secure boot loader 112, the secure service 113, and the secure debugger 114.

The debugger key is a key for starting up the execution program prog_debugger of the secure debugger 114. Examples of the debugger key include a particular user ID, a password, and so on.

The application program includes an application task, an execution program of a scheduler, and software intellectual property (IP). The scheduler is a function block included in the App CPU 121 but is omitted in FIG. 1. The scheduler may be implemented by a dedicated circuit that is provided inside the non-secure subsystem 120 and is independent of the App CPU 121. The scheduler performs arithmetic processing based on the execution program of the scheduler.

The application task involves various types of data processing. The execution program of the scheduler is a program that manages an execution order of application tasks. The software IP involves particular data processing.

The library is a collection of functions used for the application program, subroutines, and so on.

1.2 Operations

Next, the operations of the LSI 100 according to the present embodiment will be described with reference to FIG. 3 and FIG. 4. FIG. 3 is a flowchart showing an operation of the LSI 100. FIG. 4 is a diagram illustrating the operation of the LSI 100 in steps S10 to S15 in FIG. 3.

First, the LSI 100 performs the operation at power-on (steps S10 to S16 shown in FIG. 3 to be described later), and thereafter performs the normal operation (step S17 shown in FIG. 3 to be described later) or the debug operation (step S18 shown in FIG. 3 to be described later).

As shown in FIG. 3, at power-on, the secure CPU 111 loads the execution program prog_loader of the secure boot loader 112 (step S10). More specifically, as shown in FIG. 4, the secure CPU 111 loads the execution program prog_loader of the secure boot loader 112 from the secure storage 115 into the secure RAM 116. The secure CPU 111 then starts up the loaded execution program prog_loader of the secure boot loader 112 (step S11).

Next, the secure CPU 111 starts up the App CPU 121 (step S12).

Next, the secure boot loader 112 causes the secure CPU 111 to load the execution program prog_service of the secure service 113, the application program, and the library (step S13). More specifically, as shown in FIG. 4, the secure boot loader 112 causes the secure CPU 111 to load the execution program prog_service of the secure service 113 from the secure storage 115 into the secure RAM 116 and to load the application program and the library from the secure storage 115 into the DRAM 123. The secure boot loader 112 then causes the secure CPU 111 to start up the loaded execution program prog_service of the secure service 113, and causes the App CPU 121 to start up the loaded application program and library (step S14).

Next, the secure CPU 111 selects the operation mode (step S15). More specifically, as shown in FIG. 4, in the case where the secure boot loader 112 does not receive the user key from the host PC 200 via the secure port 117 for a certain time period (for example, several seconds), the secure CPU 111 selects the normal mode. On the other hand, in the case where the secure boot loader 112 receives the user key from the host PC 200 via the secure port 117 for the certain time period, the secure CPU 111 selects the debug mode.

In the case where the normal mode is selected (No in step S16), the LSI 100 performs the normal operation (step S17). In the normal mode, the LSI 100 performs image recognition processing on an input image from a camera (not shown), encrypts an image recognition result, and transmits the encrypted image recognition result to an external device (not shown). More specifically, first, the App CPU 121 controls the hardware accelerator 122 to cause it to execute the image recognition processing on the input image. The App CPU 121 obtains an image recognition result from the hardware accelerator 122. Next, the App CPU 121 describes an encryption request in the DRAM 123. The secure service 113 makes a confirmation by, for example, performing polling, as to whether or not the encryption request is periodically described in the DRAM 123. The method of causing the secure service 113 to confirm whether or not the encryption request is periodically described in the DRAM 123 is not necessarily limited to polling. In an example of other adoptable methods, after the App CPU 121 describes the encryption request in the DRAM 123, interruption is issued for the secure CPU 111, and the secure service 113 confirms whether or not the encryption request has been described in the DRAM 123. In recognition of the fact that encryption has been requested by the App CPU 121, the secure service 113 encrypts the image recognition result. Next, the secure service 113 transmits the encrypted image recognition result to the external device via the secure port 117.

On the other hand, in the case where the debug mode is selected (Yes in step S16), the LSI 100 performs the debug operation (step S18).

Figure 5:
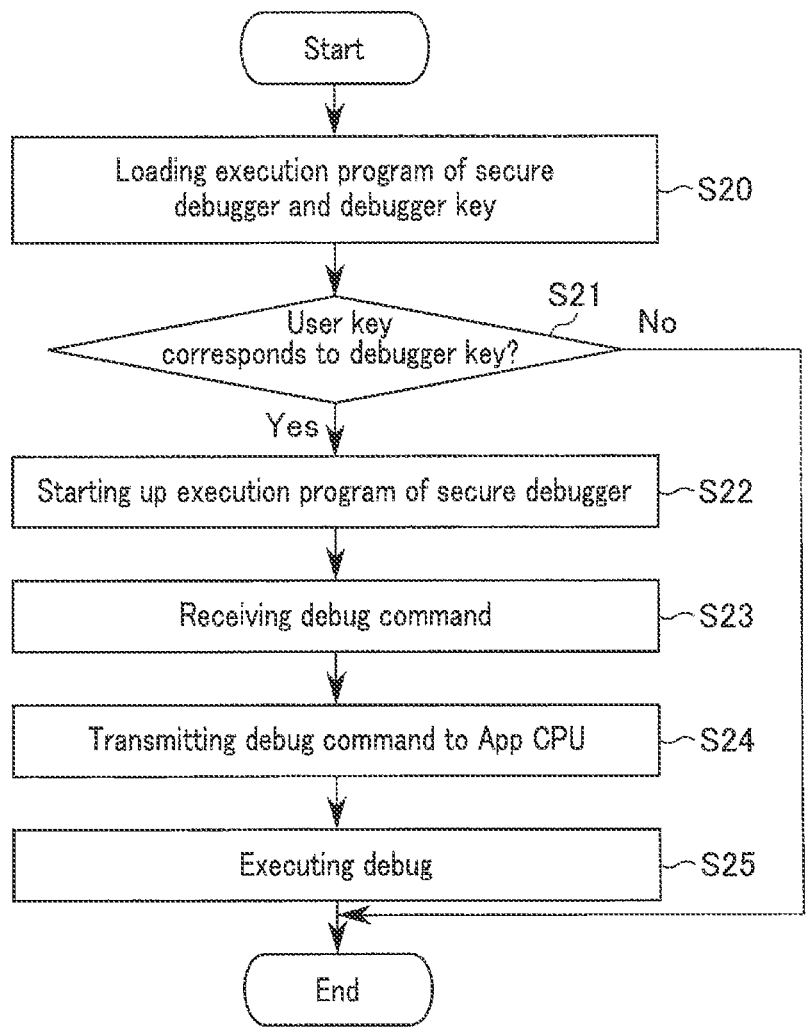
FIG. 5 is a flowchart showing a debug operation of the semiconductor device according to the first embodiment.

Hereinafter, the debug operation of the LSI 100 according to the present embodiment will be described with reference to FIG. 5 and FIG. 6. FIG. 5 is a flowchart showing the debug operation of the LSI 100. FIG. 6 is a diagram illustrating the debug operation of the LSI 100.

As shown in FIG. 5, the secure boot loader 112 causes the secure CPU 111 to load the execution program prog_debugger of the secure debugger 114 and the debugger key (step S20). More specifically, as shown in FIG. 6, the secure boot loader 112 causes the secure CPU 111 to load the execution program prog_debugger of the secure debugger 114 and the debugger key from the secure storage 115 into the secure RAM 116.

Next, the secure service 113 compares (verifies) the user key with the debugger key (step S21). As a result of comparison, in the case where the user key corresponds to the debugger key (Yes in step S21), the secure service 113 causes the secure CPU 111 to start up the execution program prog_debugger of the secure debugger 114 (step S22). On the other hand, in the case where the user key does not correspond to the debugger key (No in step S21), the secure service 113 does not cause the secure CPU 111 to start up the execution program prog_debugger of the secure debugger 114 (rejects execution of debug), and the LSI 100 terminates the debug operation.

Next, the secure debugger 114 receives a debug command (step S23). More specifically, as shown in FIG. 6, the secure debugger 114 receives the debug command from the host PC 200 via the secure port 117. Upon receipt of the debug command from the host PC 200, the secure debugger 114 transmits the debug command to the App CPU 121 (step S24). Upon receipt of the debug command from the secure debugger 114, the App CPU 121 executes debugging of the application program (step S25).

1.3 Effect

In the LSI 100 according to the present embodiment, in the case where the secure boot loader 112 receives a user key that corresponds to a debugger key from the host PC 200, the execution program prog_debugger of the secure debugger 114 is started up by the secure CPU 111, thereby allowing the secure debugger 114 to receive a debug command. The secure debugger 114 then transmits the received debug command to the App CPU 121.

With this configuration, in the case where the secure boot loader 112 does not receive the user key that corresponds to the debugger key, debugging of an application program by the secure debugger 114 cannot be executed by access from the host PC 200. This prevents a malicious user from accessing the application program and changing it, thereby realizing secure remote debugging.

2. Second Embodiment

The LSI 100 according to a second embodiment will be described. The LSI 100 according to the present embodiment is different from the first embodiment in that an additional debug information table is stored in the secure storage 115. With the addition of the debug information table, the difference from the first embodiment includes the configuration of the secure boot loader 112, the execution program prog_loader of the secure boot loader 112, the configuration of the secure debugger 114, and the execution program prog_debugger of the secure debugger 114. The following description will in principle concentrate on the features different from the first embodiment.

2.1 Configuration of Secure Boot Loader 112

As with the first embodiment, the secure boot loader 112 performs arithmetic processing based on the execution program prog_loader of the secure boot loader 112 stored in the secure storage 115. For example, in the debug mode, the secure boot loader 112 causes the secure CPU 111 to load the execution program prog_debugger of the secure debugger 114, the debugger key, and the debug information table from the secure storage 115 into the secure RAM 116. Other than this, the operation of the secure boot loader 112 is the same as that of the first embodiment. Details of the debug information table will be described later.

2.2 Configuration of Secure Debugger 114

As with the first embodiment, the secure debugger 114 performs arithmetic processing based on the execution program prog_debugger of the secure debugger 114 stored in the secure storage 115.

For example, in the debug mode, the secure debugger 114 receives the debug command and an access key from the host PC 200 via the secure port 117. Upon receipt of the debug command and the access key, the secure debugger 114 transmits the received debug command to the App CPU 121 based on the received debug command and access key, and the debug information table. Details of these operations will be described later. The access key is a key input by a user who is attempting to execute debugging of the application program by access from the host PC 200 via the secure port 117 in order to access the application program. For example, in the case where a user executes debugging of a plurality of application programs, he or she inputs a plurality of access keys respectively corresponding to the application programs. Meanwhile, the secure debugger 114 may receive the debug command and no access key. In such a case, for example, in the case where the secure debugger 114 receives no access key, and a debug target designated in the debug command falls within address ranges in which an access authority by an access key is required, the secure debugger 114 does not transmit the debug command to the App CPU 121. On the other hand, in the case where the secure debugger 114 receives no access key, and the debug target designated in the debug command does not fall within the address ranges in which an access authority by an access key is requested, the secure debugger 114 may transmit the debug command to the App CPU 121.

2.3 Programs, Etc. in Secure Storage 115

Figures 7, 8:
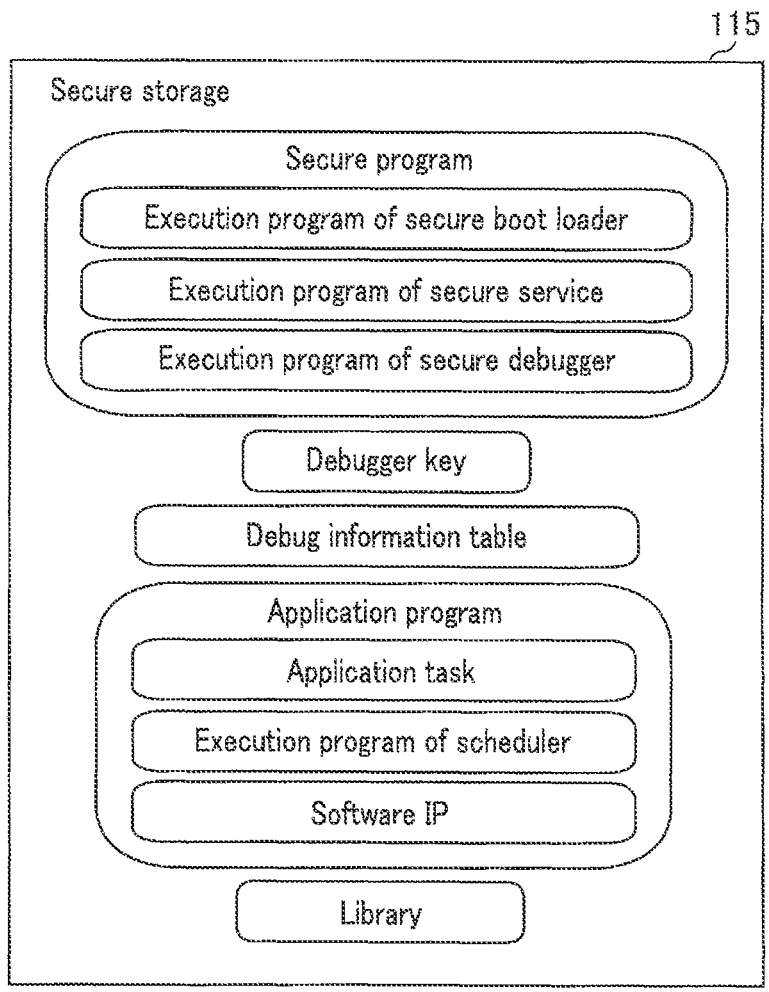
FIG. 7 is a diagram showing programs, etc. stored in a secure storage included in a semiconductor device according to a second embodiment.
FIG. 8 is a conceptual diagram of a debugging information table stored in the secure storage included in the semiconductor device according to the second embodiment.

Details of programs, etc. stored in the secure storage 115 included in the LSI 100 according to the present embodiment will be described with reference to FIG. 7. FIG. 7 is a diagram showing one example of programs, etc. stored in the secure storage 115 included in the LSI 100 according to the present embodiment.

The secure storage 115 stores the secure program, the debugger key, the debug information table, the application program, and the library.

As with the first embodiment, the secure program includes the execution program prog_loader of the secure boot loader 112, the execution program prog_service of the secure service 113, and the execution program prog_debugger of the secure debugger 114. The execution program prog_loader of the secure boot loader 112 realizes the aforementioned function of the secure boot loader 112. The execution program prog_debugger of the secure debugger 114 realizes the aforementioned function of the secure debugger 114. The execution program prog_service of the secure service 113, the debugger key, the application program, and the library are the same as those of the first embodiment.

The debug information table is a table for permitting access to an application program which is a debug target. A concept of the debug information table will be described with reference to FIG. 8. FIG. 8 is a conceptual diagram showing an example of the debug information table.

As shown in FIG. 8, the debug information table includes a plurality of entries (three entries in the example of FIG. 8). Each entry includes an application program, an address range, and a permission key. The application program is a name of the application program. The address range is an address range in which an access authority by an access key is requested in a corresponding application. The permission key is a key for permitting access with respect to a corresponding address range.

For example, in the example shown in FIG. 8, with respect to application task task001, an address range in which an access authority by an access key is requested is 0x4000_000 to 0x4100_000, and a permission key for permitting access is 0x12345678. With respect to application task task002, an address range in which an access authority by an access key is requested is 0x4200_000 to 0x4300_000, and a permission key for permitting access is 0xaa55bb44. With respect to software IP softIP001, an address range in which an access authority by an access key is requested is 0x5000_000 to 0x5300_000 and 0x6000_000 to 0x6100_000, and a permission key for permitting access is 0x18273645.

2.4 Operations

Figure 9:
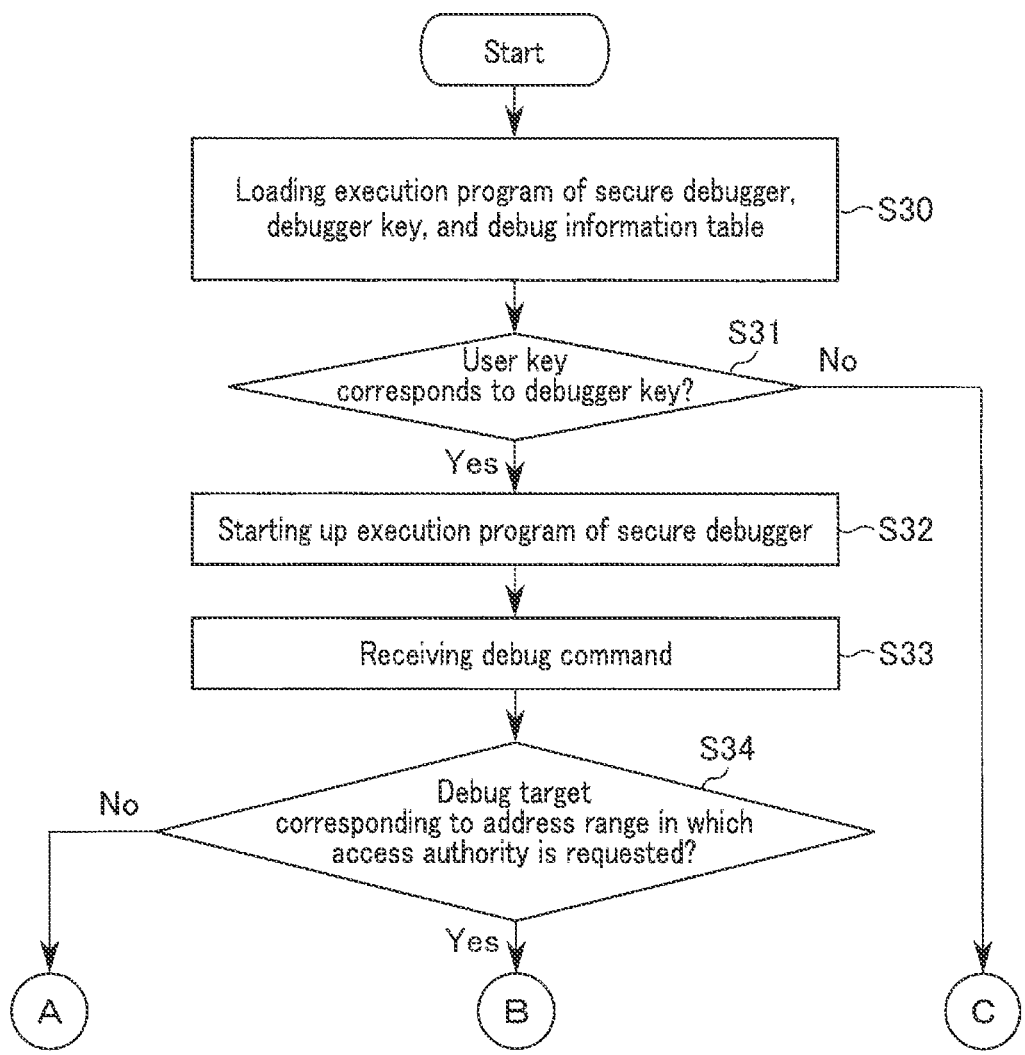
FIG. 9 is a flowchart showing a debug operation of the semiconductor device according to the second embodiment.
Figure 10:
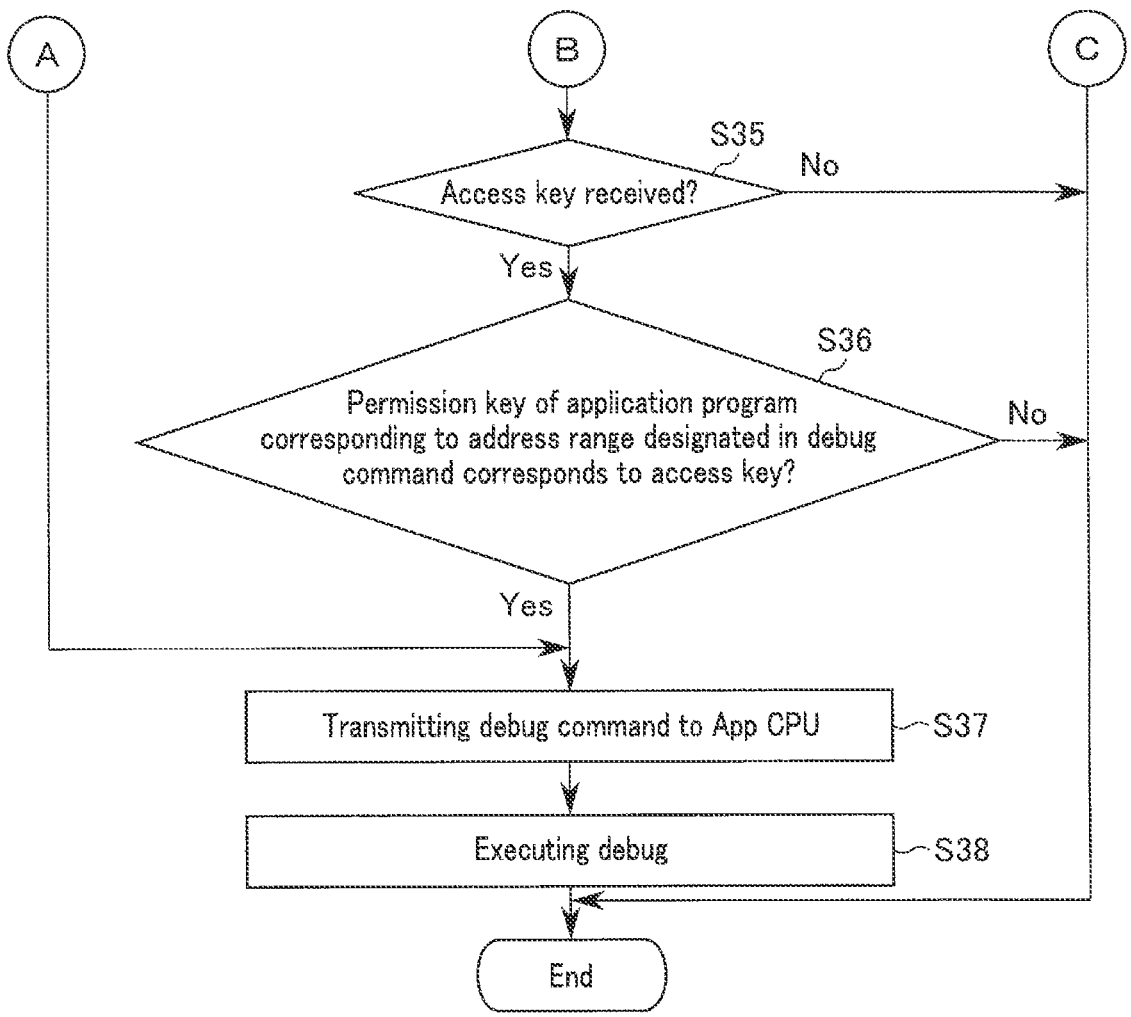
FIG. 10 is a flowchart showing the debug operation of the semiconductor device according to the second embodiment.
Figure 11:
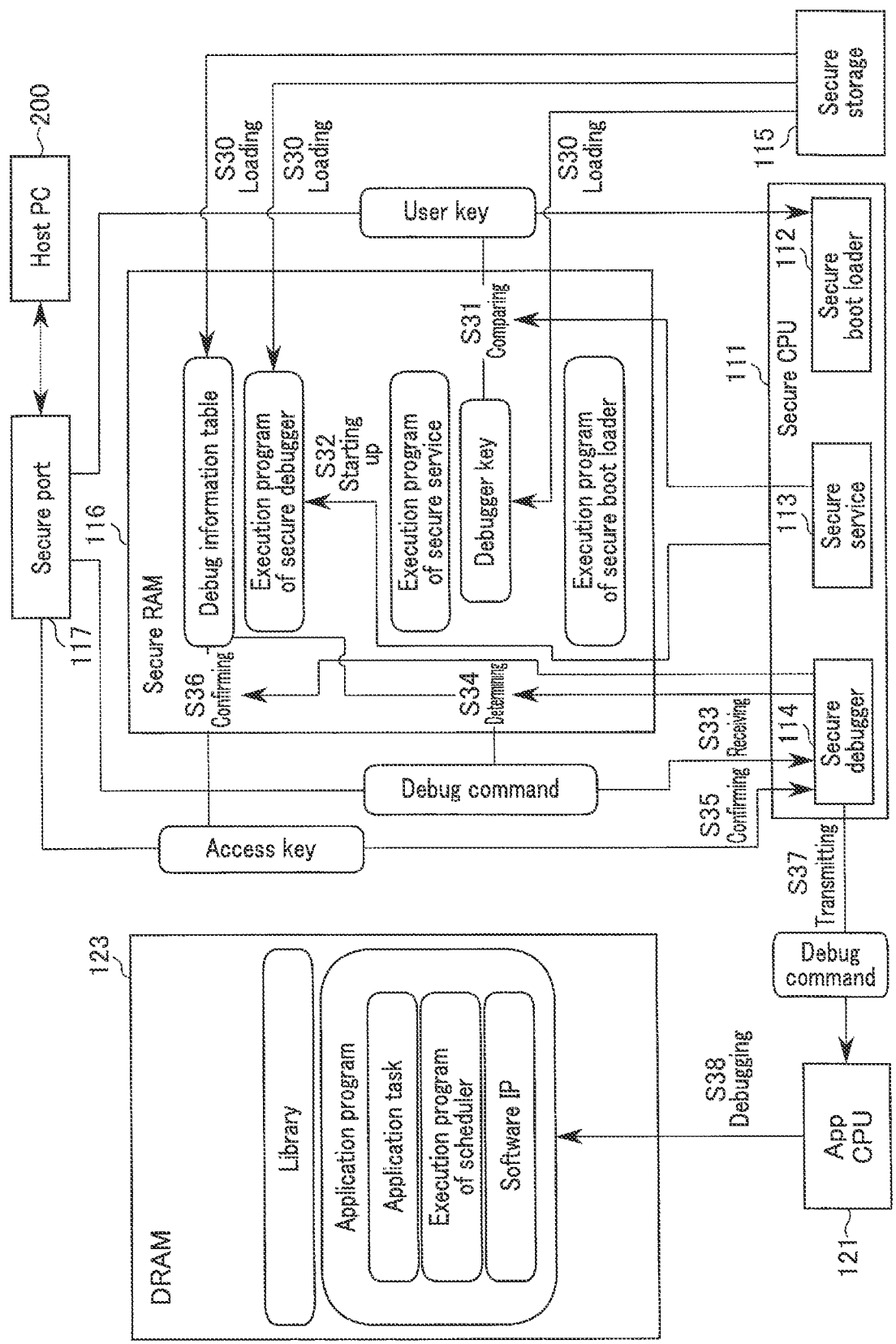
FIG. 11 is a diagram illustrating the debug operation of the semiconductor device according to the second embodiment.

Next, the operations of the LSI 100 according to the present embodiment will be described. The operations of the LSI 100 according to the present embodiment are the same as those of the first embodiment except for the debug operation. Hereinafter, the debug operation of the LSI 100 according to the present embodiment will be described with reference to FIG. 9 and FIG. 10. FIG. 9 and FIG. 10 are each a flowchart showing the debug operation of the LSI 100. FIG. 11 is a diagram illustrating the debug operation of the LSI 100.

As shown in FIG. 9, the secure boot loader 112 causes the secure CPU 111 to load the execution program prog_debugger of the secure debugger 114, the debugger key, and the debug information table (step S30). More specifically, as shown in FIG. 11, the secure boot loader 112 causes the secure CPU 111 to load the execution program prog_debugger of the secure debugger 114, the debugger key, and the debug information table from the secure storage 115 into the secure RAM 116.

Next, the secure service 113 compares the user key with the debugger key (step S31). As a result of comparison, in the case where the user key corresponds to the debugger key (Yes in step S31), the secure service 113 causes the secure CPU 111 to start up the execution program prog_debugger of the secure debugger 114 (step S32). On the other hand, in the case where the user key does not correspond to the debugger key (No in step S31), as shown in FIG. 10, the secure service 113 does not cause the secure CPU 111 to start up the execution program prog_debugger, and the LSI 100 terminates the debug operation.

Next, the secure debugger 114 receives the debug command (step S33). More specifically, as shown in FIG. 11, the secure debugger 114 receives the debug command from the host PC 200 via the secure port 117. Upon receipt of the debug command from the host PC 200, the secure debugger 114 determines whether or not a debug target designated in the debug command falls within address ranges in which an access authority by an access key is requested (step S34). More specifically, for example, the secure debugger 114 performs an OR operation on the address ranges in which an access authority by an access key is requested within the debug information table, and determines whether or not an operation result contains the address range of the debug target designated in the debug command. For example, in the case where the operation result contains the address range of the debug target designated in the debug command, the secure debugger 114 determines that the debug target falls within the address ranges in which an access authority by an access key is requested. Furthermore, in the case where the operation result does not contain an address range of a debug target designated in the debug command, the secure debugger 114 determines that the debug target does not fall within the address ranges in which an access authority by an access key is requested.

In the case where the secure debugger 114 determines that the debug target does not fall within the address ranges in which an access authority by an access key is requested (No in step S34), as shown in FIG. 10, the secure debugger 114 transmits the debug command to the App CPU 121 (step S37). Upon receipt of the debug command from the secure debugger 114, the App CPU 121 executes debugging of the application program (step S38).

On the other hand, in the case where the secure debugger 114 determines that the debug target falls within the address ranges in which an access authority by an access key is requested (Yes in step S34), as shown in FIG. 10, the secure debugger 114 confirms whether or not the access key has been received (step S35). More specifically, as shown in FIG. 11, the secure debugger 114 confirms whether or not an access key has been received from the host PC 200 via the secure port 117.

In the case where the secure debugger 114 has not received an access key (No in step S35), the secure debugger 114 does not transmit the debug command to the App CPU 121 (rejects execution of debug), and the LSI 100 terminates the debug operation.

On the other hand, in the case where the secure debugger 114 receives the access key (Yes in step S35), the secure debugger 114 confirms whether or not a permission key of an application program corresponding to an address range designated in a debug command corresponds to the access key (step S36). For example, in the case where the secure debugger 114 receives two or more access keys from the host PC 200, the secure debugger 114 confirms whether or not a permission key of an application program corresponding to an address range designated in a debug command corresponds to each access key.

As a result of confirmation, in the case where the permission key of the application program corresponding to the address range designated in the debug command corresponds to the access key (Yes in step S36), the secure debugger 114 transmits the debug command to the App CPU 121 (step S37). Upon receipt of the debug command from the secure debugger 114, the App CPU 121 executes debugging of the application program (step S38). On the other hand, in the case where the permission key of the application program corresponding to the address range designated in the debug command does not correspond to the access key (No in step S36), the secure debugger 114 does not transmit the debug command to the App CPU 121 (rejects execution of debug), and the LSI 100 terminates the debug operation.

2.5 Effect

In the LSI 100 according to the present embodiment, in the case where the secure boot loader 112 receives a user key that corresponds to a debugger key, the secure debugger 114 is started up by the secure CPU 111, thereby allowing the secure debugger 114 to receive a debug command.

Furthermore, in the LSI 100 according to the present embodiment, in the case where the secure debugger 114 receives the debug command that designates, as a debug target, an address range in which an access authority by an access key is requested, the secure debugger 114 receives an access key, and can transmit the debug command to the App CPU 121 in the case where the received access key corresponds to a permission key of an application program corresponding to an address range designated in the debug command within the debug information table.

With this configuration, it is possible to prevent a malicious user from accessing an application program including an address range (address range desired to be confidential) in which an access authority is requested and changing an application program including an address range in which an access authority is requested, thereby realizing secure remote debugging. Furthermore, assuming the case in which a division of labor is established for each application program, a user without an access authority can be prevented from maliciously reading or changing a software IP to be protected as intellectual property.

3. Third Embodiment

The LSI 100 according to a third embodiment will be described. In comparison with the first embodiment, the LSI 100 is internally provided with an additional switch. The following description will in principle concentrate on the features different from the first embodiment.

3.1 Overall Configuration of Vehicle-Mounted System

An overall configuration of a system including the LSI 100 according to the present embodiment will be described with reference to FIG. 12. FIG. 12 is a block diagram showing the overall configuration of the system including the LSI according to the present embodiment.

As shown in FIG. 12, the secure subsystem 110 further includes a switch 118. The switch 118 is coupled to the secure bus. The switch 118 is controlled by a user. For example, in the case where the switch 118 is set to OFF, the normal mode is selected. In the case where the switch 118 is set to ON, the debug mode is selected. Examples of the switch 118 include a DIP switch, and so on.

3.2 Operations

Next, the operations of the LSI 100 according to the present embodiment will be described. The operations of the LSI 100 according to the present embodiment are the same as those of the first embodiment except for the operation of selecting the operation mode. The flowchart showing the operations of LSI 100 according to the present embodiment is the same as FIG. 3 and FIG. 5. Hereinafter, the operation of selecting the operation mode of the LSI 100 according to the present embodiment will be described.

In the present embodiment, the secure CPU 111 selects the operation mode based on whether the switch 118 is in an ON state or an OFF state at power-on (step S15 in FIG. 3). For example, in the case where the switch 118 is in the OFF state, the secure CPU 111 selects the normal mode and performs the normal operation (step S17 in FIG. 3). On the other hand, in the case where the switch 118 is in the ON state, the secure CPU 111 selects the debug mode and performs the debug operation (step S18 in FIG. 3 and steps S20 to S25 in FIG. 5).

In the present embodiment, when the switch 118 is switched by a user with the power supply in an ON state, the secure CPU 111 selects the operation mode based on whether the switch 118 is in the ON state or the OFF state. For example, when the switch 118 is switched from the OFF state to the ON state with the power supply in the ON state, the secure CPU 111 selects the debug mode and performs the debug operation. On the other hand, when the switch 118 is switched from the ON state to the OFF state with the power supply in the ON state, the secure CPU 111 selects the normal mode and performs the normal operation.

3.3 Effect

According to the present embodiment, secure remote debugging can be realized. The configuration according to the present embodiment is applicable to the second embodiment.

4. Modifications, Etc.

As described in the above, the semiconductor device (100) according to the embodiments includes a first system (120) including a first operation circuit (121), and a second system (110) configured to control a debug operation in the first system. The semiconductor device (100) includes a normal mode and a debug mode. In the debug mode of the semiconductor device (100), in a case where a first key (user key) received from an outside corresponds to a second key (debugger key) stored in the second system (110), the second system (110) transmits a debug command to the first operation circuit (121).

The embodiments are not limited to those described in the above, and various modifications can be made.

In the example described in the above embodiments, in the debug mode, the access key is transmitted every time a user transmits the debug command. The secure debugger 114 may store the access key transmitted lastly by a user from the host PC 200. In such a case, the user does not have to transmit the access key for every transmission of the debug command. The secure debugger 114 may transmit the debug command to the App CPU 121 based on the received debug command, the stored access key, and the debug information table.

In the example described in the above, the LSI according to the embodiments is applied to the vehicle-mounted system. However, the LSI according to the embodiments is applicable to the consumer system, too.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A semiconductor device comprising:
   a first system including a first operation circuit; and
   a second system configured to control a debug operation in the first system,
   wherein the semiconductor device includes a normal mode and a debug mode,
   in the debug mode of the semiconductor device, where the semiconductor device is in the debug mode, a first key received from an outside corresponds to a second key stored in the second system, and a debug target designated in a debug command is not an address range in which an access authority is requested, the second system transmits the debug command to the first operation circuit, and
   where the semiconductor device is in the debug mode, the first key corresponds to the second key, and the debug target designated in the debug command is an address range in which an access authority is requested, the second system transmits the debug command to the first operation circuit based on a third key received from an outside.

2. The device according to claim 1, wherein the second system includes a second operation circuit, and in the debug mode of the semiconductor device, in a case where the semiconductor is in the debug mode, and the first key corresponds to the second key, the second operation circuit brings the second system into a state in which the debug command is receivable from an outside.

3. The device according to claim 2, wherein the second system further includes a communication port configured to perform a communication with an outside via a network, and the second system receives the debug command from an outside via the communication port.

4. The device according to claim 1, wherein the second system further includes a table, and when in a case where the semiconductor is in the debug mode, the first key corresponds to the second key, the debug target designated in the debug command is an address range in which an access authority is requested, in a case where and the third key corresponds to a fourth key corresponding to the address range designated in the debug command within the table, the second system transmits the debug command to the first operation circuit.

5. The device according to claim 1, wherein at power-on, in a case where the second system does not receive the first key, the second system selects the normal mode, and in a case where the second system receives the first key, the second system selects the debug mode.

6. The device according to claim 1, wherein the second system further includes a switch, and at power-on, in a case where the switch is in an OFF state, the second system selects the normal mode, and in a case where the switch is in an ON state, the second system selects the debug mode.

7. The device according to claim 6, wherein in a case where the switch is switched from the OFF state to the ON state, the second system selects the debug mode, and in a case where the switch is switched from the ON state to the OFF state, the second system selects the normal mode.

8. A system comprising:
a semiconductor device including:
a first system including a first operation circuit;
a second system configured to control a debug operation in the first system; and
a computer configured to communicate with the second system via a network,
wherein the semiconductor device includes a normal mode and a debug mode,
in the debug mode of the semiconductor device, where the semiconductor device is in the debug mode, a first key received from an outside corresponds to a second key stored in the second system, and a debug target designated in a debug command is not an address range in which an access authority is requested, the second system transmits the debug command to the first operation circuit, and
where the semiconductor device is in the debug mode, the first key corresponds to the second key, and the debug target designated in the debug command is an address range in which an access authority is requested, the second system transmits the debug command to the first operation circuit based on a third key received from an outside.

* * * * *